April 18, 1944.  L. E. HARPER  2,346,964
POSITIVE DISPLACEMENT PUMP
Filed Aug. 26, 1940   2 Sheets-Sheet 1
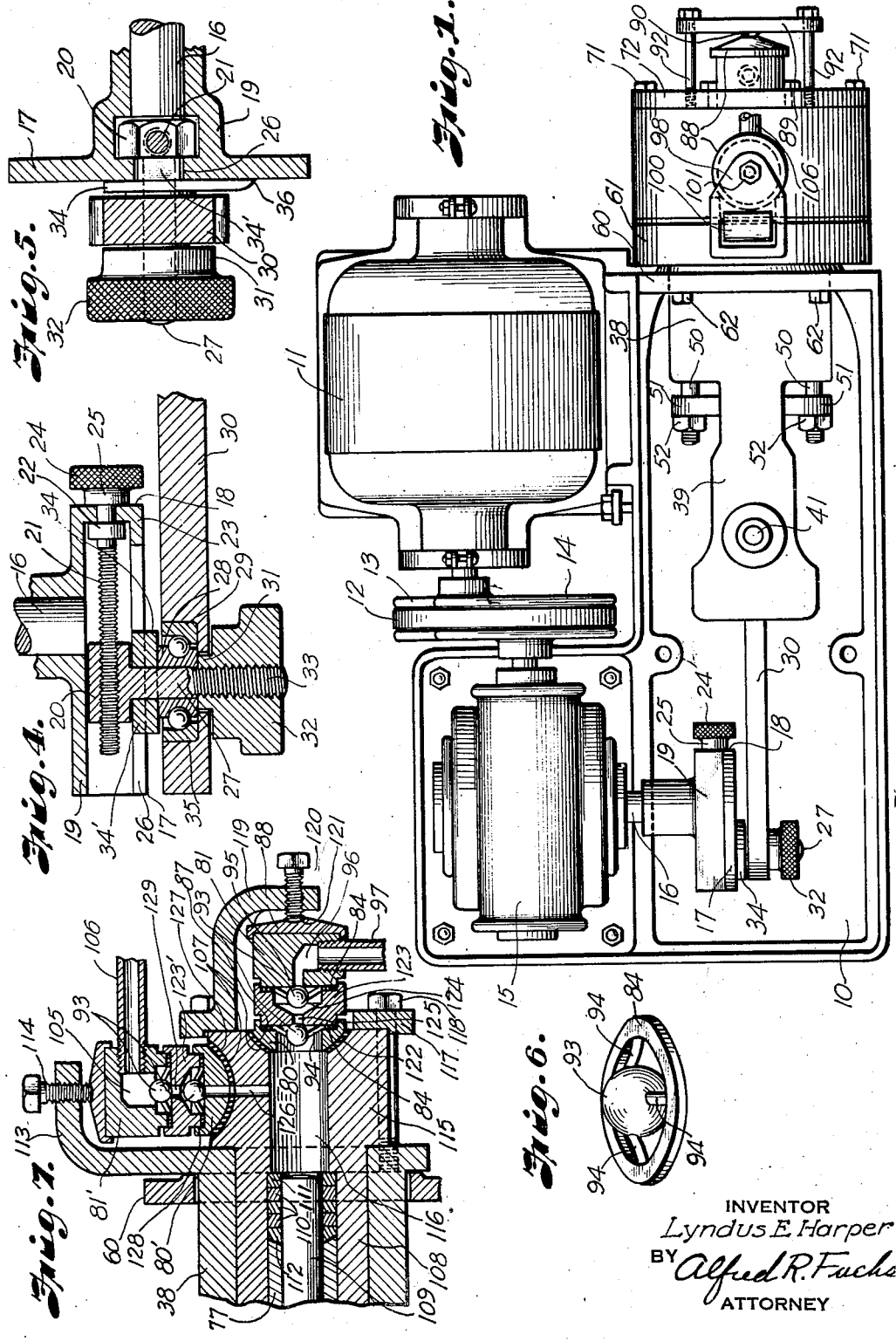
INVENTOR
Lyndus E. Harper
BY Alfred R. Fuchs
ATTORNEY April 18, 1944. L. E. HARPER 2,346,964
POSITIVE DISPLACEMENT PUMP
Filed Aug. 26, 1940 2 Sheets-Sheet 2
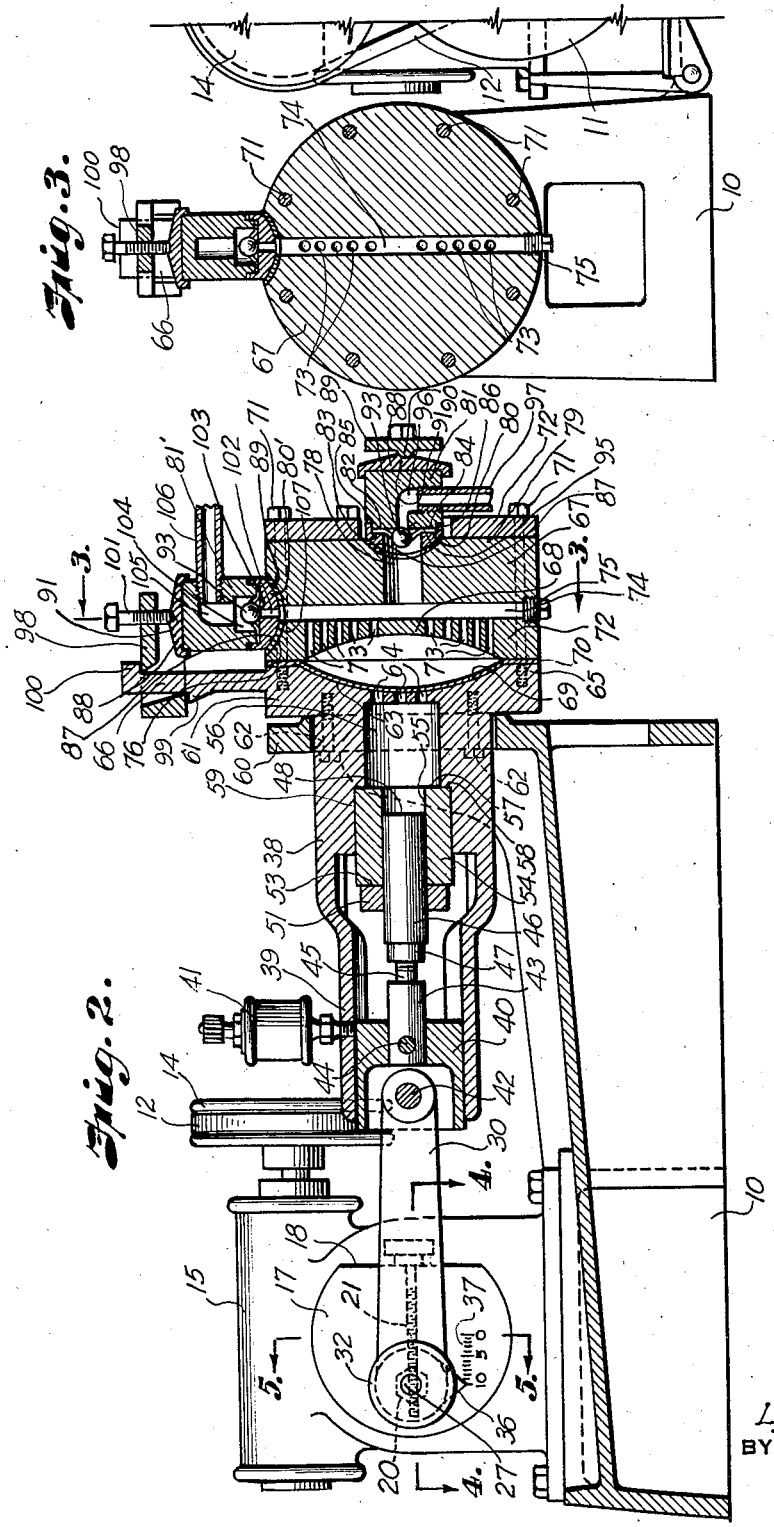
INVENTOR
Lyndus E. Harper
BY
Alfred R. Fuchs
ATTORNEY Patented Apr. 18, 1944

2,346,964

UNITED STATES PATENT OFFICE 2,346,964

POSITIVE DISPLACEMENT PUMP

Lyndus E. Harper, Kansas City, Mo., assignor to Omega Machine Company, Kansas City, Mo., a corporation of Missouri Application August 26, 1940, Serial No. 354,164

3 Claims. (Cl. 103—44)

My invention relates to a liquid feeding device of a pump-like character for accurately metering the amount of liquid fed by each reciprocation of the pumping device, said pumping device being of a positive displacement character.

It is a particular purpose of my invention to provide a positive displacement pump for accurately measuring small quantities of liquid, said pump discharging an exact quantity of liquid for each cycle of operations thereof, comprising an intake and discharge stroke. Preferably, this is accomplished by providing a diaphragm pump, which is provided with inlet and outlet valves that are provided with means for opening and closing the same in timed relation to the strokes of the pump.

Preferably, my improved pumping device embraces means for varying the amount of liquid pumped for each discharge stroke of the pump, so that the measured amount of liquid furnished at a certain rate of rotation of the pump may be adjusted as desired, this being, preferably, accomplished by adjusting the length of the stroke of the reciprocable member that acts to produce the pumping action, the adjusting means being, preferably, provided with indicating means thereon showing the adjustment of the parts to get the desired feed per stroke. The indicating means may be provided with any desired scale, such as an arbitrary scale, or a scale that indicates directly the amount of liquid being pumped per stroke, or some other unit of measurement.

One of the purposes of my invention is to provide pumping means for obtaining such accurate pumping for liquid measurement as above referred to, which comprises a diaphragm for varying the liquid capacity of the pump chamber, and means for flexing the diaphragm, said means, preferably, comprising a reciprocable plunger, or piston, that acts on a non-compressible, or substantially non-compressible, liquid in a sealed space between said plunger and diaphragm to flex the diaphragm in opposite directions as the capacity of said space is varied.

It is a particular purpose of my invention to provide in a pump of the above mentioned character, a cylinder with a piston, or plunger, therein, that has a liquid-tight fit between the cylinder and piston or plunger, so as to prevent any leakage past the engaging walls of the piston, or plunger, and cylinder, without the use of packing material, the engaging surfaces of the cylinder and the piston, or plunger, being made of a material of such hardness that these can be made to fit so closely that the liquid interposed between the piston, or plunger, and the diaphragm, will not leak past the piston, or plunger.

It is a further purpose of my invention to provide a positive feed diaphragm pump of the above mentioned character, in which the extreme positions of the diaphragm, at the change of direction in the stroke of the piston, or plunger, are such that the diaphragm will be supported by the chamber walls between which the diaphragm is located, said chamber walls being, preferably, of a continuous concavely curved character, and having a number of openings therein, through which communication is established with the intake and discharge valves and with the plunger, or piston chamber, on opposite sides of the diaphragm.

It is a further purpose of my invention to provide a new and improved valve mounting and valve structure for a pump of the above mentioned character, particularly for use where liquids of a corrosive character are encountered, comprising a ball check valve and means that are unaffected by liquids of a corrosive character for holding said ball check valve yieldingly against a seat, and further to provide a mounting for the valve member on the pump body that is of such a character that the clamping means used for clamping the valve body to the pump body will positively seat the valve body in liquid-tight relation to the pump body, even though the clamping means should not be absolutely aligned properly with the valve body seat, the seat being of a self-aligning character, so as to take care of any slight variations that may exist in the manufacture of the parts.

Other objects and advantages of my invention will appear as the description of the drawings proceeds. I desire to have it understood, however, that I do not intend to limit myself to the particular details shown or described, except as defined in the claims.

In the drawings:

Fig. 1 is a top plan view of the preferred form of my improved positive displacement pump.

Fig. 2 is a view partly in side elevation and partly in section, of the pump shown in Fig. 1.

Fig. 3 is a section taken on the line 3—3 of Fig. 2.

Fig. 4 is a fragmentary section taken on the line 4—4 of Fig. 2, on a somewhat enlarged scale.

Fig. 5 is a section taken at right angles to Fig. 4.

Fig. 6 is a perspective view of a valve member detached, and

Fig. 7 is a fragmentary sectional view of a modification.

Referring in detail to the drawings, my improved positive feeding pump is provided with a base member 10, in which is mounted a motor 11, which, through the belt 12 operating over the pulleys 13 and 14, and a speed reducer 15, operates a shaft 16, upon which is mounted so as to rotate therewith, a crank having a disk-like body portion 17.

The disk-like member 17 is provided with a flat end face 18 and a hollow rib 19 that extends across the rear side of said disk perpendicularly to the flat end face 18. A head or block 20 is slidably mounted in the guideway provided by said hollow rib, said block 20 having a rod-like member 21 screw-threadedly engaged therewith, a collar 22 being fixed to said rod-like member 21 and engaging the inner face of the end wall 23 of the hollow rib 19, through which said rod-like member extends, said rod-like member having a knurled head 24 thereon externally of the disk-like member 17 and having a reduced hub portion 25 that engages the flat end face 18 of said disk-like member. It will be obvious that as the knurled head 24 is rotated the block 20 will advance either to the right or left on the threaded portion of the rod-like member 21, dependent upon the direction of rotation of the knurled head 24.

Integral with said block 20 and projecting through a slot 26 in the disk-like member 17 is a threaded member 27, said block 20 being, preferably, the head of a bolt and the member 27 the threaded shank thereof. A ball bearing having an inner race 28 is mounted in a circular opening 29 in a piston rod 30, said piston rod also having an opening receiving loosely the reduced hub portion 31 of a knurled nut 32, that engages the threads 33 of the member 27, said nut serving to clamp the washer 34, mounted between the inner ball race 28 and the face of the disk 17, to said disk in adjusted position. The outer ball race 35 is, of course, fixed in the opening in the piston rod and the washer 34 is provided with a pointed projection 36 serving as an indicator member cooperating with the scale 37 to indicate the adjustment of the wrist pin, and said washer has a rib 34' thereon seated in the slot 26 to prevent rotation of the washer 34 relative to the disk 17.

It will be obvious that the slidable block 20 can be moved along in the guideway provided therefor in the hollow rib 19, by turning the knurled nut 32 to release the clamping action of the washer 34, whereupon the knurled head 24 on the threaded rod-like member 21 can be rotated to move the block to a desired adjusted position, which is indicated by the indicator member 36 on the scale 37, the zero point being at the point at which the axis of the member 27 will be aligned with the axis of the shaft 16. As soon as the desired adjustment has been accomplished the nut 32 can be tightened up to clamp the parts in adjusted position.

The pump body 38 comprises a guide portion 39, in which the crosshead 40 is slidably mounted in the usual manner, suitable lubricating means 41 being provided therefor. The piston rod 30 is pivotally connected to the crosshead 40 at 42 in any desired manner, and a rod-like member 43 is fixed in position in an axial opening in the crosshead, by means of a pin 44, or any other suitable means, said rod-like member 43 having a reduced end portion 45, which is threaded and which engages in a screw-threaded opening in a piston, or plunger, 45, a lock nut 47 being provided for fixing the plunger, or piston, 46 in adjusted position on the rod-like member 43. Said piston, preferably, has a flat forward face 48 perpendicular to the cylindrical wall of the plunger 46 and intersecting the same in a sharp corner, which serves to wipe any oil or other liquid off the cylindrical wall of the bore in which the same operates.

The body portion 38 of the pump is provided with a plurality of threaded rod-like members 50 projecting therefrom, on which a clamping plate 51 is mounted, the same being held in clamping position by means of the nuts 52. Said clamping plate 51 engages flatly with the flat outer end 53 of the cylindrical member 54, which is made of a very hard alloy steel, or similar material, that can be provided with a cylindrical bore 55 that conforms in diameter to the outer cylindrical wall of the plunger 46 so closely that there will be no leakage between said cylindrical walls at all, of the liquid that is used in the chamber formed within the pump comprising the cylindrical bore in the cylinder 54 and the cylindrical chamber 56 in the main pump body 39.

The hardened cylindrical member 54 also has a flat face 57 that engages flatly with a shoulder 58 in the pump body at the end of the chamber 56, said cylindrical member seating snugly in a bore 59 in said pump body. The cylinder 54 and the plunger 46 are, preferably, made of an alloy that can be nitrided, such as the alloy known as "nitralloy," manufactured by the Ludlum Steel Company, which is a low carbon-manganese-silicon-chromium-molybdenum-steel alloy, containing aluminum. This alloy can be surface hardened so as to have such an extremely hard surface that it will not be scored, and will not gall when used in the manner illustrated. While this particular alloy is here described, any other alloy having the same, or substantially the same, properties of hardness and toughness, when properly treated to obtain such hardness, may be utilized for these parts, the important feature being that these are so constructed and are of such hardness that no packing whatsoever is necessary between the plunger and the cylinder to obtain a liquid-tight joint.

An absolutely liquid-tight joint can be obtained in this manner, by utilizing a liquid of such viscosity in the chamber 56 and the chamber within the cylinder 54 communicating therewith, that it will not leak past the piston 46, but will be sufficiently mobile as to accomplish the desired purposes of transferring the force exerted by the plunger 46 through the liquid to the diaphragm, which will be described below. Viscous oils and other similar liquids can be utilized, which are readily obtainable, which will not harmfully affect the diaphragm.

The pump body 38 is mounted on an upwardly extending wall 60 of the base member 10, said pump body passing through an opening in said wall and having an enlargement 61, providing a flat face that is clamped to a flat face of the wall 60, by suitable securing elements 62 screw-threaded into the enlargement 61. The chamber 56 extends into said enlargement 61, and said enlargement has a concave wall portion 63, through which a plurality of openings 64 extend to the chamber 56. The concave wall portion 63 is surrounded by a flat annular portion 65 and an arm, or bracket, 66 extends upwardly from the enlargement 61 for a purpose to be described below.

A removable head member 67 completes the pump body, said head member 67 having a concavely curved wall 68 that lies opposite the concavely curved wall 63 when the parts are in assembled relation, and a flat annular wall 70 surrounding the concave wall 68, the walls 63 and 68 being oppositely curved to form a pump chamber between the same, in which the flexible diaphragm 69 is mounted, the marginal portion of which is clamped between the flat annular faces 65 and 69, by means of threaded headed securing elements 71 extending through openings in a ring-like member 72 and into threaded openings in the enlargement 61 of the body portion 38. While the member 67 can be made of any desired material, including metal, if corrosive materials are to be pumped, the head portion 67 is, preferably, made of hard rubber, or a plastic material, that is not affected by such corrosive liquids, and in order that the compression of the clamping elements will be transmitted over a large area of the member 67, if made of such molded plastic or hard rubber, the ring 72 is provided. Obviously it could be dispensed with if the member 67 is made of metal.

The head member 67 is provided with a plurality of openings, or passages, 73 extending through said portion 67 from the concavely curved wall 68 to a transverse passage 74, which may extend downwardly through the wall of the member 67 and be provided with a threaded portion to receive a drain plug 75, and which extends also at its upper end to a concavely curved valve body seat 76. A chamber or passage 78 is provided in the head communicating with said passage 74 and opening into a concavely curved valve body seat 79, similar to the seat 76.

The intake or inlet valve comprises a valve body member made up of two separable portions 80 and 81, which are provided with meeting faces that have offsets therein so as to provide an inner annular ledge, or seat, 82 on the portion 81 opposite a similar ledge, or seat, 83 on the portion 80, between which is mounted the annular portion 84 of a valve member, said valve member being made, preferably, of a compressible material not affected by corrosive liquids, such as rubber, or rubber strengthened by fabric. An outer annular shoulder 85 is also provided on the member 81 that engages a corresponding annular shoulder 86 on the valve body portion 80. The valve body portion 80 has a convex end face 87 corresponding in curvature to the concave valve body seat 79. The valve body portions 80 and 81 may be made of molded plastic material, or of hard rubber, or any other material that will not be affected by corrosive liquids.

A cap member 88 embraces the outer end of the valve body portion 81 and a clamping bar 89 has a rounded projection 90 thereon that seats in a rounded opening 91 in the cap member 88, said clamping bar having openings therein for receiving the bolts 92 screw-threadedly engaging openings in the clamping ring 72. Due to the concave seat, or recess, 79 and the convex end wall 87 of the valve body portion 80, the valve body made up of the portions 80 and 81 will be clamped tightly in liquid-tight relation to the pump head 67 by the clamping bar 89, it being obvious that any slight misalignment will be compensated for by the rocking connection between the bar 89 and the cap 88, and by the curved seating faces of the valve body and the socket therefor in the pump head. Also the annular outer portion 84 of the valve member will be similarly clamped in position between the two portions 80 and 81 of the valve body, determining the position of the valve and sealing the joint between the two parts of the valve body.

The valve comprises a ball valve member 93, which is connected with the annular ring-like portion 84 of the valve, by means of connecting members 94, which are thin resilient strips of material of the same character as the portions 84 and 93, there being any desired number of the members 94 provided, the type of valve shown in Fig. 6 having four thereof. The ball member 93 is thus centered relative to the annular member 84, and the connecting members 94 being of a resilient character, will serve as loading means for the valve to hold it against its seat. The inlet valve is provided with a seat for the ball valve member 93 at 95, controlling communication between the passage 96 and the valve body portion 81, and the passage 78 leading into the pump. Any suitable conduit means, such as the tubular member 97, communicates with the passage 96, the resilient band members 94, of course, holding the ball member 93 against the seat 95 until there is a sufficient drop in pressure on the side of the valve facing the interior of the pump relative to that on the side of the valve facing the passage 96 that the tendency of the resilient members 94 to seat the ball member 93 will be overcome.

Loosely connected with the arm, or bracket, 66 is a bar-like lever 98. An enlargement 99 providing a shoulder, is provided on the arm 66 and a lateral enlargement, or head, 100 is provided on the bracket, or arm, 66 spaced from the enlargement 99, the bar-like member 98 being mounted between these and having an opening loosely receiving the arm, or bracket, 66. Said clamping lever, or bar, 98 is provided with a threaded opening, through which the headed screw-threaded member 101 extends, which engages with a cap member 88 of the outlet valve, said cap member having a rounded recess, or socket, 91 therein, such as previously described, receiving the rounded end of the screw-threaded member 101. The outlet valve is made up of a body member having the portions 80' and 81', the valve portion 80' being related to the valve portion 81' in the same manner as the valve portion 80 is related to the valve body portion 81. The valve body portion 80' also has a convex inner face 87 that engages the concave valve body seat 76 in the same manner as the concave seat 79 in the case of the valve body portion 80. However, the valve body portion 80 has a wide passage therein for freedom of movement of the ball valve member 93 in a direction away from the valve body portion 81, while the valve body portion 80' has a restricted passage 102 therein that provides a seat at 103 for the ball valve 93, and the valve body portion 81' has a chamber 104 therein allowing for movement of the ball valve 93 away from the seat at 103. The valve is clamped in position between the two valve body portions 80' and 81', in a similar manner to that previously described, and it will be obvious that when the pressure within the pump becomes higher than that in the chamber 104 communicating with the passage 105 leading to the discharge pipe 106, the valve 93 will become unseated and liquid will be discharged from the pump into the outlet pipe 106.

It will be obvious that as the plunger, or piston, 46 reciprocates in the cylinder 54 the capacity of the chamber made up of the chamber 56 and the bore of the cylinder 54 ahead of the piston, or plunger, will be varied and as the capacity thereof decreases, the non-compressible, or substantially non-compressible, liquid therein will pass through the openings 64 and will flex the diaphragm 69 toward the curved wall 68 and away from the curved wall 63, thus decreasing the capacity of the pump chamber on the opposite side of the diaphragm from the chamber 56 and causing the outlet valve to be unseated. As soon as the reverse movement of the plunger 46 begins, the diaphragm 69 will begin to move in the opposite direction due to the difference in pressure on opposite sides thereof, increasing the capacity of the pump chamber on the side thereof opposite that on which the piston is located, and the ball valve member 93 of the outlet valve will be seated, while the ball valve 93 of the inlet valve member will be unseated, and liquid will be drawn in through the conduit 97 and passage 96 into the pump chamber, this continuing until the movement of the plunger 46 to the left in Fig. 2 is ended.

As previously pointed out, the stroke of the plunger can be regulated by adjusting the throw of the crank formed by the disk member 17 and the bolt-like member upon which the piston rod 30 rotates. When the stroke is adjusted to its maximum length, the diaphragm 69 will engage the curved wall 63 at one end of its stroke, and the curved wall 68 at the other end of its stroke, preventing undue flexing of the diaphragm and causing the same to always have a smooth curvature that will prevent any sharp flexing, or creasing, thereof that might damage the same. It will also be obvious that as the stroke of the plunger 46 is varied, the amount of liquid pumped by the movements of the diaphragm 69 through the outlet valve of the pump will be varied in proportion to the variation of the length of the stroke of said plunger. It is, of course, also obvious that the mounting of the outlet valve member made up of the body portions 80' and 81' is self-aligning, so that even if there are some slight variations in construction, the valve members can be replaced with others of similar type and these will readily seat properly in position to provide a tight joint between the head of the pump and the valve body members. Preferably, a compressible packing material is provided between the valve body member and the head portion of the pump body, this being better illustrated in Fig. 7, in which said compressible material is shown at 107.

In Fig. 7 a slightly modified form of valve structure is shown, and instead of being shown as being applied to a diaphragm pump, the same is shown as being applied to an ordinary piston pump having a cylinder 108, within which a plunger 109 is mounted to reciprocate. A plurality of compressible packing members 110 and 112 are mounted between an annular shoulder 111 provided at the junction of the cylinder 108 and pump chamber 116 and a packing gland 77. The body portion 38 of the pump is mounted in a similar manner to that previously described and has a curved bracket 113 thereon receiving the screw-threaded headed member 114.

The head portion 115 of the pump is provided with a pump chamber 116 and is provided with a clamping ring 117 secured by the bolt-like members 118 to the body portion 38, a curved bracket member 119 extending from the ring-like member 117 and having a screw-threaded headed member 120 mounted therein. The member 120 has a curved end portion that seats in a curved socket 121 in the cap member 88 that engages the valve body member 81, which has the passage 96 therein, previously described, leading to the conduit 97, and which has a seat 95 for the ball valve 93. The valve body portion 80 is the same as previously described and is seated in a concave socket 122, similar to that previously described in connection with Fig. 2, but an additional valve body portion 123 is provided between the valve body portions 80 and 81, the members 80, 81 and 123 being clamped together with the annular portions 84 of the valve members clamped between the same, as will be obvious from Fig. 7. The member 123 is provided with a recess, or chamber, 124 permitting the unseating of the ball member 93, and is also provided with a restricted passage 125, providing a seat for the ball member 93 of the valve mounted between the member 123 and the member 80. It will be obvious that any desired number of the members 123 can be inserted between the valve members 80 and 81 to provide a multiple ball check valve that is provided with resilient means for seating the same.

The valve body seat 122 leads directly into the valve chamber 116. A passage 126 leads from the chamber 116 to the concavely curved valve body seat 127. The outlet valve in the form of the invention shown in Fig. 7 has the valve body portion 81', previously described, and the valve body portion 80', previously described, but between the valve body portions 80' and 81' is interposed a valve body portion 123', the valve body portion 123' operating in a similar manner to the valve body portion 123 used in conjunction with the valve body portions 80 and 81, but is of a reverse character, having a chamber 128 therein to accommodate the ball member 93 of the valve that is clamped between the member 80' and the member 123', and having a restricted passage 129 providing a seat for the ball member 93 of the valve that is clamped between the valve body portion 81' and the valve body portion 123'. It will, of course, be obvious that a plurality of the members 123' can be used and that by the use of the member 123' a multiple ball check outlet valve, that has resilient means for seating the same, is provided. It will be obvious that the valve mounting shown in Fig. 7 will provide for automatic alignment of the valve body members relative to the pump, in a similar manner to that described in connection with Fig. 2. It will also be obvious that the valve body members can be made of any desired material, such as hard rubber, or a transparent molded plastic, which will resist the corrosive action of corrosive liquid that will pass through the same, such transparent valve bodies permitting easy observation of the operation and condition of said valves, the valves themselves being made of softer rubber having such resiliency that the portions 94 of the valves will act as spring means for seating the balls, or in some cases could be made of metal, such as stainless steel or bronze or other alloys, the ball members 93 in such case not being integral with the fingers 94.

While my improved pump and valve structure is adapted for pumping any kind of liquid and the valve structure for use with any kind of pump, the pump structure and valve structure are particularly adapted for use with liquids that would attack valve structures, metallic valve means and metallic pump structures. In the diaphragm pump shown the head portion, or detachable portion, of the pump that clamps the diaphragm to the body portion of the pump, and the diaphragm, as well as the valve bodies and the valve members, are capable of being made of a material that will resist corrosion by liquids that are to be pumped therethrough and come in engagement therewith. The clamping means for the head portion and the clamping means for the valve body members is so made that none of the clamping means will be exposed to the corrosive liquid that is being pumped and at the same time all joints will be made tight, so that none of the liquid can escape except through the desired valve to the outlet conduit, and at the same time the clamping means is so disposed as to place no undesirable stresses on the head portion of the pump nor the valve structures.

What I claim is:

1. A device of the character described comprising a body portion having a chamber therein, a cylinder in open communication with said chamber, a reciprocable member in said cylinder, said body portion having a concave recess in one end thereof, an annular seat surrounding said recess, the concave wall of said recess having passages therethrough extending from said chamber, a detachable head member having a similar concave recess in the end thereof facing the recessed end of said body portion, an annular seat on said head surrounding said recess, a flexible diaphragm mounted between said head and body portion, means for clamping said head to said body portion to clamp said diaphragm between said seats, comprising a clamping member having a wide annular flat face flatly engaging said head on the end thereof opposite said recess and having a central opening, an inlet valve mounted on the end of said head opposite said concave recess in alignment with the opening in said clamping member, and an outlet valve mounted on the upper side of said head, said head having intersecting passages therein leading to said valves from the concavely curved wall of said recess in said head.

2. A pump for moving a predetermined measured quantity of liquid therethrough for each cycle of operations thereof, comprising a pump body having a pump chamber therein, a hardened cylinder in said pump body in wide open communication with said pump chamber, said cylinder being seated in an opening in said pump body having a seat receiving the end wall of said cylinder at the bottom thereof, means on said pump body engaging a projecting end of said cylinder to clamp said cylinder liquid tight against said seat, a hardened piston mounted to reciprocate in said cylinder in liquid tight sealing engagement therewith, means for reciprocating said piston, a removable head on said pump body, said head and said body being recessed on the opposing faces thereof to define a diaphragm chamber, said head and body portion having seats surrounding the recesses therein, a diaphragm clamped between said seats in sealing engagement therewith, said pump body having means providing communication between said diaphragm chamber on one side of said diaphragm and said pump chamber, said pump chamber, the portion of said cylinder between said pump chamber and said piston and the portion of said diaphragm chamber between said diaphragm and said pump chamber constituting a sealed liquid chamber of fixed capacity, a fixed quantity of a substantially non-compressible liquid confined against escape in said chamber of fixed capacity, said head having a chamber of variable capacity therein on the opposite side of said diaphragm from said pump body, and inlet and outlet valves communicating with said chamber of variable capacity.

3. In a pump of the character described, a metallic body portion, a detachable head of low tensile strength cooperating with said head to define a pump chamber, means for clamping said head to said body portion comprising an annular member having a wide flat annular face flatly engaging said head, said head having a passage therein leading to said pump chamber from a concave seat in the face of said head, valve means having a convex end engaging said seat, said annular member having an opening therein through which said valve means extends in spaced relation to the wall of said opening, and self aligning clamping means on said member adjustable relative thereto to clamp said valve to said seat.

LYNDUS E. HARPER.